United States Patent Office 3,272,241
Patented Sept. 13, 1966

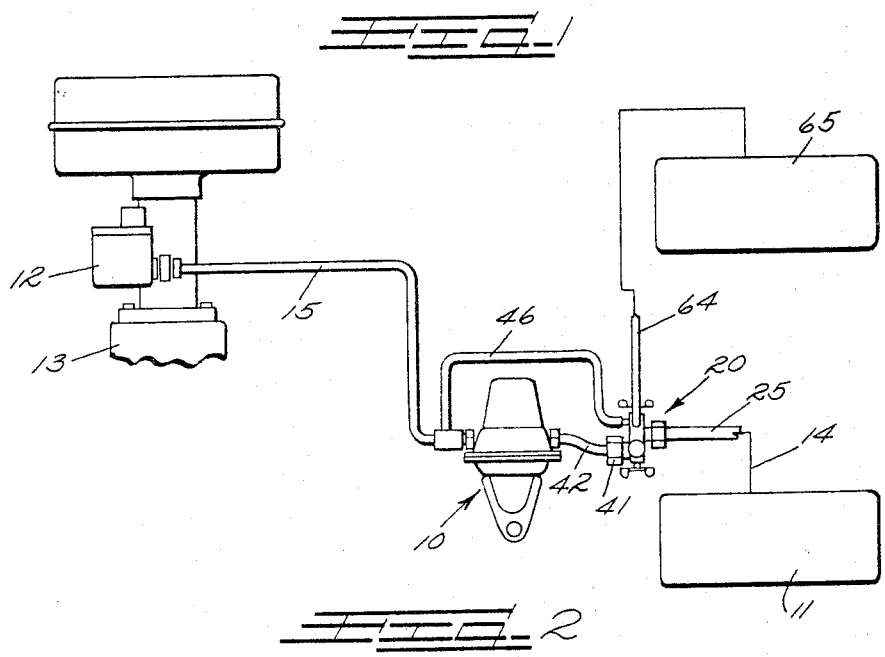
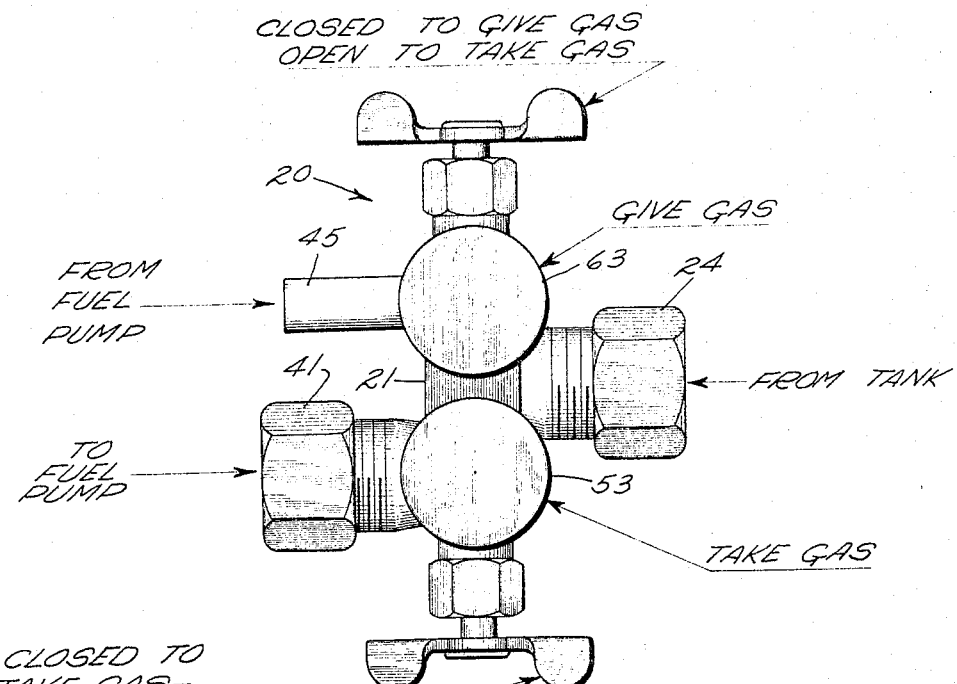

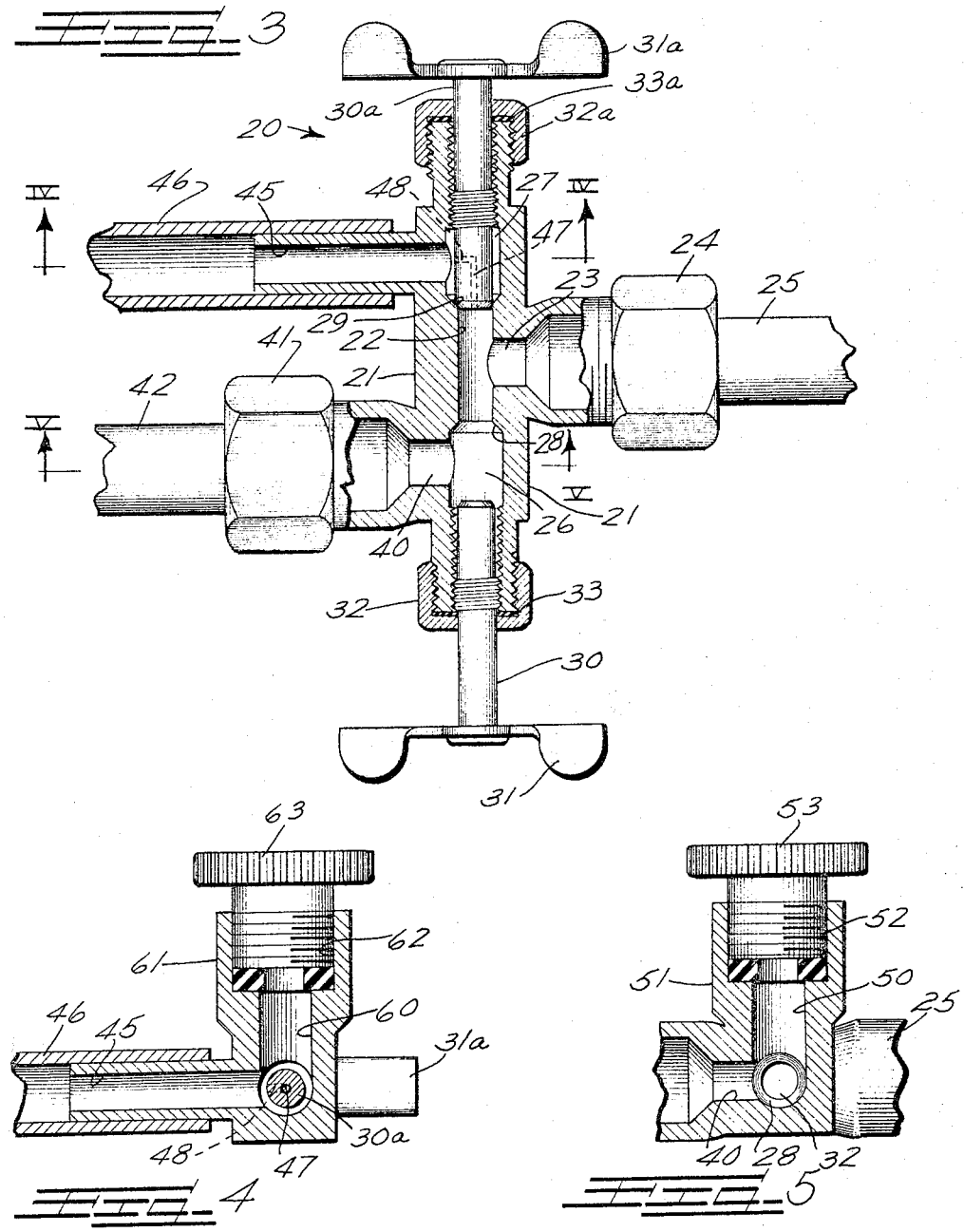

3,272,241
FUEL EXCHANGER DEVICE
Samuel Wagner, 2405 Hillsdale Drive E.,
Brookfield, Wis.
Filed Apr. 13, 1964, Ser. No. 359,309
5 Claims. (Cl. 141—388)

This invention relates to a fuel exchanger device and to a system of transferring fluid fuel from one fluid fuel receptacle to another, utilizing the internal combustion engine of an automotive vehicle as the source of power.

In my application Ser. No. 224,706, filed Sept. 19, 1962, now U.S. Patent No. 3,170,495, I have described a fuel exchanger device for use in transferring liquid fuel, such as gasoline, from one automotive vehicle, equipped with my device, to the tank of another automotive vehicle not so equipped. Such a fuel exchanger system as described in that application has its principal usefulness in making possible the transfer of gasoline from police cars to the empty gas tanks of stranded motorists.

My present invention makes possible not only the transfer of liquid fuel from the car equipped with my fuel exchanger device to the tank of another car, but also the transfer of liquid fuel from the tank of a car not equipped with my fuel exchanger device to a car that is so equipped. In other words, the transfer of liquid fuel may be in either direction so long as one car of the two cars involved is equipped with the fuel exchanger device of my invention. Additionally, my present invention involves the further feature of eliminating flooding of the engine of the car in which my fuel exchanger device is installed, with resultant freedom from flooding difficulties and also saving in fuel and oil consumption.

It is therefore an important object of this invention to provide a new and improved system of exchanging liquid fuel between two motor vehicles in either direction, or for taking liquid fuel from a reserve tank or delivering liquid fuel to such reserve tank where the same is not a part of the fuel system of an automotive vehicle, employing in any of these instances the motor of the system-equipped vehicle for effecting such transfer of the fuel.

It is a further important object of this invention to provide a fuel exchanger device which, if connected into the system of one automotive vehicle, makes possible the withdrawal of liquid fuel from the tank of another motor vehicle, or from a separate fuel receptacle, merely by making a simple fuel line connection therebetween and operating the engine of the vehicle so equipped with my fuel exchanger device.

Other and further important objects of this invention will become apparent from the following description of the embodiments of the invention illustrated in the accompanying drawings, in which:

FIGURE 1 is a partly schematic and partly elevational view of a system embodying the principles of my invention;

FIGURE 2 is an enlarged elevational view of a multi-passaged and multi-ported valve structure for use in the system of FIGURE 1;

FIGURE 3 is a longitudinal sectional view of the valve structure of FIGURE 2, with parts in elevation and parts broken away;

FIGURE 4 is an enlarged fragmentary sectional view taken substantially along the line IV—IV of FIGURE 3; and FIGURE 5 is an enlarged fragmentary sectional view taken substantially along the line V—V of FIGURE 3.

The reference numeral 10 indicates generally a fuel pump of the conventional diaphragm type, used in automotive vehicles, such as automobiles, trucks and the like that are driven by an internal combustion engine. As is customary in gasoline-powered automotive vehicles, the pump 10 is a part of a fuel system that includes a fuel tank 11, a carburetor 12 and an internal combustion engine 13. The fuel pump 10, if of the diaphragm type, is operated in a conventional way from the drive mechanism of the car or vehicle, when the engine 13 is turned over, as in starting, and when the engine is running. During such operation, liquid fuel is withdrawn from the tank 11 through a fuel line 14 leading to the intake of the pump 10, and is discharged by the pump through a fuel line 15 leading to the carburetor 12, and thence to the engine 13.

In accordance with the principles of my present invention, a fuel exchanger device, indicated generally by the reference numeral 20, is positioned in the fuel line 14 between the tank 11 and the pump 10. Said device 20, as best illustrated in FIGURES 2 and 3, comprises a multi-passaged and multi-ported valve body 21 that is of a generally elongated, cylindrical form with an axially extending passage therethrough that includes an intermediate main passage 22. A first side passage 23 is in constant flow communication with said main passage 22 and is adapted to be connected through a coupling union 24 with that portion 25 of the fuel feed line 14 that is shown in FIGURE 3. Open flow communication for fuel from the tank 11 to the main passage 22 of the valve device 20 is thus established at all times.

Said main or through passage 22 is provided with enlarged chambers at both of its ends, as at 26 and 27, and valve seats 28 and 29, respectively, are formed between said main passage 22 and said enlarged chambers 26 and 27 (FIG. 3). The valve seat 28 has associated with it a threaded type of plug valve 30, actuatable by a butterfly-type handle 31 for movement into seating relationship against the seat 28 to close the port provided thereby, or by reverse movement to open said port. A suitable gland nut 32, in cooperation with a gasket 33, completes the housing for the stem of the valve 30. A similar valve structure serves to control the port provided by the valve seat 29 and this similar valve structure is indicated by the same reference numerals with the subscript *a*.

Still with reference to FIGURE 3, a second side passage 40 leads from the enlarged chamber 26 for connection through a coupling union 41 and the line 42 into the intake side of the pump 10. Since the valve seat 28 is between the side passage 40 and the main passage 22, the connection therebetween is closed when the valve 30 is seated against the seat 28, but since the chamber 26 is enlarged as compared with the stem of the valve 30, there is always open communication between said chamber 26 and the side passage 40.

A third side passage 45 provides an outlet from the enlarged chamber 27, through a by-pass fuel line 46 to the discharge side of the pump 10. Due to the enlarged size of the chamber 27 with respect to the stem of the valve 30*a*, there is always open communication between said chamber 27 and the side passage 45, even when the valve is closed, but closure of the valve 30*a* by seating against the seat 29 closes flow communication between the main passage 22 and said chamber 27 and the side passage 45.

Valve 30*a*, unlike the valve 30, is provided with an axially extending capillary bore 47 extending through the valve end and a lateral connecting capillary bore 48 opening into the chamber 27 when the valve 30*a* is closed. The purpose of these capillary passages will be explained as the description proceeds.

In addition to the three side passages just described there are two other side passages from the valve body 21, the center lines of which lie in a plane at right angles to the plane of the center lines of the first three side passages. A fourth side passage 50 (FIG. 5) extends from and is in open flow communication with the enlarged valve chamber 26 and also, on the outside of the valve body 21, with a nipple 51. Said nipple 51 is internally threaded, as at 52, for the reception of a closure cap 53 when said passage 50 is not in use. The purpose of this fourth side passage 50 will be explained in connection with the operation of my fuel exchanger device.

A fifth side passage, indicated generally by the reference numeral 60 (FIG. 4) is in open flow communication with the enlarged fuel chamber 27 of the valve 20 and on the outside is provided with a nipple 61 that is internally threaded as at 62, for closure, when not in use, by a closure cap 63.

As illustrated in FIGURE 1, when the closure cap 63 is removed, a connection may be made through a flexible line 64 to a fuel receptacle 65, which may be the fuel tank of a second automotive vehicle or may be any fuel receptacle. In either case, liquid fuel can be transferred through the temporary flexible line 64 from the fuel system just described to the fuel receptacle 65.

As previously pointed out herein, if an automotive vehicle is equipped with the fuel transfer system just described, the system can be used for transferring liquid fuel from the car so equipped to another car, or for taking liquid fuel from the tank of another car or from any receptacle containing the fuel. These operations will now be described in the order stated.

When it is designed to transfer fuel from the system-equipped car to another car, the cap 63 is removed and the flexible conduit 64 is connected from the nipple 61 to the other tank 65. With valve 30 open and the valve 30a closed, as shown in FIGURE 3, fuel is drawn into the valve structure 20 through the line 25 from the tank 11, thence through the first side passage 23 into the main passage 22; thence into the enlarged valve chamber 26 and out through the second side passage 40 into the line 42 to the intake side of the pump 10; and from the pump 10 the fuel is discharged partly through the line 15 to the carburetor 12 and engine 13 to keep the engine running and partly through the by-pass line 46 into the third side passage 47, thence into the enlarged chamber 27 and out through the fourth side passage 60 and nipple 61 through the flexible conduit 64 to the tank 65.

When it is desired to take fuel from the tank of another car or from any fuel receptacle, the valve 30 is closed and the valve 30a is opened, the closure cap 53 is removed and the flexible conduit 64 is connected to the nipple 52, the closure cap 63 remaining in closing relation to the nipple 61. With the engine 13 running, liquid is drawn from the tank 65 through the line 64 into the nipple 51 and thence into the enlarged valve chamber 26. Since the valve 30 is closed, the liquid fuel from said chamber 26 is withdrawn through the side passage 40 into the line 42 to the pump 10, and from the discharge side of the pump 10 is led back through the by-pass line 46 and third side passage 45 into the enlarged valve chamber 27, from which the liquid fuel, since the valve 30a is open, is discharged out through the first side passage 23 into the line 25 leading to the tank 11. During this taking of fuel, of course, some of the fuel is discharged from the pump 10 into the line 15 to the carburetor 12 and thence to the engine 13 to keep the engine running, so that it is only the excess of liquid fuel that is returned to the tank 11 through the by-pass in the manner just described.

In the description of the valve 30a it was pointed out that an axial capillary bore 47 and a right-angle capillary bore 48 communicating therewith are provided in the inner end of said valve 30a. The purpose of these capillary bores is to eliminate excessive pressure of fuel on the pressure side of the pump and to return fuel that might otherwise cause flooding of the engine. Such return of excess fuel is by way of the by-pass 46 to the valve chamber 27 and thence through the capillary bores 48–47 into the main passage 22 and back through the first side passage 23 into the fuel tank 11. As is well understood, such building up of pressure of the pressure side of the pump occurs when the engine is shut off, and it is at this time that the capillary bores 48–47 function to relieve such pressure. The result is a considerable saving in gas that would be otherwise wasted by flooding of the engine.

It will thus be seen that my fuel exchanger system serves for the following purposes: first, to transfer liquid fuel on a vehicle equipped with my system to a second vehicle in need of fuel; secondly, to transfer liquid fuel from the tank of a second vehicle, or from some other receptacle containing liquid fuel, to the system-equipped car; and, thirdly, to reduce or eliminate the flooding of the engine when it is shut off, and thereby save on both gas fuel and oil consumption.

While the invention has been particularly described in connection with the internal combustion engine systems of automobiles, it will be understood that the invention finds usefulness also in other types of automotive vehicles, including trucks, tractors and power motor boats. The use of my fuel exchanger system, to a large extent, makes unnecessary the hazardous practice of carrying extra cans, or containers, of gasoline in the trunks of automotive vehicles, where the vapors may collect if the container is not absolutely tight.

It will be apparent that many modifications and variations may be effected without departing from the scope of the novel concepts of the present invention.

I claim as my invention:

1. In a system for transferring liquid fuel from a receptacle to the tank of an automotive vehicle having a fuel tank, an internal combustion engine, a fuel pump and lines connecting said tank, engine and pump for pumping fuel from said tank to said engine, when the latter is running, a fuel exchanger device comprising
   a multi-passaged valve body in the line between said tank and said pump,
   a first connection from the discharge side of said pump to said valve,
   a second connection from said valve to said receptacle and valve means associated with said valve body for opening passages through said valve body establishing flow communication from said receptacle to said pump and from said pump to said tank while closing communication between said tank and the intake side of said pump,
   whereby said pump can be operated to transfer fuel from said receptacle to said tank while said engine is running.

2. A system as defined by claim 1, wherein said second connection includes a flexible conduit detachably connected to said valve to a port thereof; and a cap for closing said port when said flexible conduit is disconnected.

3. A system as defined by claim 1, wherein said valve body is also provided with a port optionally connectible to a second automotive vehicle tank to deliver fuel from said first mentioned tank to said second tank.

4. A system as defined by claim 1, wherein said valve means includes capillary bores operative to relieve fuel pressure on the pressure side of said pump under all settings of said valve means.

5. A fuel exchanger device for transferring fuel from a fuel receptacle to a fuel tank of an automotive vehicle having an internal combustion engine, a carburetor, a fuel pump and fuel lines connecting said tank, said pump, said carburetor and said engine, said device comprising
   a multi-passaged, multi-ported valve body, said valve body having a longitudinally extending main passage, a first side passage from said main passage having a port for connection to the line from said tank, a second side passage having a port for connection to the line to said fuel pump, a third side passage having a port for connection to the line from said fuel pump, and a fourth side passage having a port for connection to said fuel receptacle, a first valve controlling communication between said main passage and adapted to be open when transferring fuel from said receptacle to said fuel tank, a second valve controlling communication between said second side passage and said main passage adapted to be closed when transferring fuel from said receptacle to said fuel tank, and said fourth side passage and port remaining open and in communication with said second side passage when transferring fuel from said receptacle to said fuel tank.

References Cited by the Examiner

UNITED STATES PATENTS

| | | | |
|---|---|---|---|
| 2,232,198 | 2/1941 | Ashworth | 137—572 X |
| 2,779,506 | 1/1957 | Gajda | 141—388 X |

LAVERNE D. GEIGER, *Primary Examiner.*

H. BELL, *Examiner.*